United States Patent
Unternahrer et al.

(10) Patent No.: US 6,197,133 B1
(45) Date of Patent: Mar. 6, 2001

(54) SHORT-PULSE HIGH-PEAK LASER SHOCK PEENING

(75) Inventors: Josef Robert Unternahrer; William Taylor Lotshaw, both of Niskayuna; Phillip Randall Staver, Hagaman, all of NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/252,620

(22) Filed: Feb. 16, 1999

(51) Int. Cl.[7] ............................. C21D 1/09; H01S 3/098
(52) U.S. Cl. ................. 148/525; 148/565; 219/121.61; 372/10; 372/18
(58) Field of Search ................................. 148/525, 565; 219/121.61, 121.68, 121.69; 372/10, 18

(56) References Cited

U.S. PATENT DOCUMENTS

| | | |
|---|---|---|
| 3,850,698 | 11/1974 | Mallozzi et al. . |
| 4,401,477 | 8/1983 | Clauer et al. . |
| 4,937,421 | * 6/1990 | Ortiz, Jr. et al. ............... 219/121.68 |
| 5,127,019 | 6/1992 | Epstein et al. . |
| 5,131,957 | 7/1992 | Epstein et al. . |
| 5,730,811 | 3/1998 | Azad et al. . |
| 5,911,891 | 6/1999 | Dulaney et al. . |
| 6,005,219 | 12/1999 | Rockstroh et al. . |

OTHER PUBLICATIONS

Liu, "Generation of High–Power Nanosecond Pulses from a Q–Switched Nd:YAG Oscillator using Intracavity–Injecting Technique," Optical Society of America, vol. 4, No. 11, 1979, 5 pages.

Dane et al, "Laser Peening of Metals—Enabling Laser Technology," Lawrence Livermoore National Laboratory, UCRL–JC–129029, Nov. 13, 1997, pp. cover and 1–15.

* cited by examiner

*Primary Examiner*—George Wyszomierski
*Assistant Examiner*—Janelle Combs Morillo
(74) *Attorney, Agent, or Firm*—Patrick K. Patnode; Marvin Snyder (57) ABSTRACT

A target is laser shock peened by directing against an ablative coating thereon a laser beam pulse having a fluence, duration, and corresponding peak power effective for ablating the coating to form a plasma and shock wave therein. The plasma is confined adjacent the target to plastically deform the target by the shock wave to develop residual compressive stress therein. The pulse has a duration less than ten nanoseconds and a corresponding peak power for increasing coupling efficiency between the pulse and plasma.

13 Claims, 5 Drawing Sheets

SHORT-PULSE HIGH-PEAK LASER SHOCK PEENING

BACKGROUND OF THE INVENTION

The present invention relates generally to shot peening, and, more specifically, to laser shock peening.

In conventional shot peening, small balls are fired against the surface of a metallic workpiece or target to create plastic deformation and a corresponding residual compressive stress. The residual stress improves the useful fatigue life of the workpiece when used in a high stress application.

Laser shock peening (LSP) is being developed to provide improvements in forming the residual compressive stress in a workpiece. A laser is operated in a pulse mode for directing laser pulses against a workpiece surface, which surface typically has a light absorbing ablative coating confined by a thin, optically transparent, inertial confinement layer of water, for example. The laser pulse vaporizes the coating in a small explosion to form a high temperature plasma that is confined by the water, developing an instantaneous pressure pulse or shock wave that plastically deforms the workpiece surface to generate residual compressive stress.

A significant control parameter in this process is the fluence of the laser beam that is defined as the pulse energy per unit area of the beam. Fluence at the target must exceed a threshold value for effecting laser shock peening, but fluence in the resonator or oscillator producing the laser beam must be low to prevent optical damage.

This control may be accomplished by using a low energy oscillator followed in turn by several increasingly large aperture rod amplifiers in which pulse energy is increased while the fluence is maintained below the damage threshold, protecting the laser equipment from optical damage. However, this configuration requires many laser heads or lasing gain media, optical pumping flash lamps, power supplies, and related equipment that increases the complexity of the system and the system's susceptibility to failure during operation.

Another useful laser system having few components is disclosed in U.S. Pat. No. 5,730,811-Azad et al. In this configuration, a large Q-switched, cavity-dumped, laser oscillator produces a significant fraction of the required energy for laser shock peening in a single-head resonator, with an additional amplifier cooperating therewith. This high energy laser requires suitably large aperture optical elements and a Pockels cell for effecting the Q-switching and cavity-dumping. The large elements reduce the fluence in the oscillator for preventing thermal damage thereto from the high energy laser beam created therein.

Another significant control parameter is the intensity or irradiance, defined as the fluence divided by the pulse duration. Since the desired residual stress distribution of a workpiece covers a finite area, and the LSP processing requires a fluence threshold that depends upon the workpiece material, a minimum energy per laser pulse is required. Since the treatment of production parts entails processing areas much larger than a single laser spot, the throughput of the process is limited by the average power and repetition rate of the source laser system.

The operating laser parameters contributing to the intensity control parameter including pulse energy, fluence, duration, intensity, and repetition rate, along with laser system size and efficiency are interrelated in effecting laser shock peening in a commercially viable system. Particularly problematic in presently known laser shock peening are the high energy requirements such as 50 Joules per pulse, 200 Joules/square centimeter, and 20 nanosecond pulse duration, that require large, complex, and expensive laser systems operating close to their damage threshold design limits, having correspondingly limited throughput capability and efficiency, and correspondingly high maintenance requirements.

Accordingly, it is desired to effect laser shock peening at lower pulse energy and increased pulse repetition rates for improving efficiency and throughput, and lowering maintenance cost and down-time.

BRIEF SUMMARY OF THE INVENTION

A target is laser shock peened by directing against an ablative coating thereon a laser beam pulse having a fluence, duration, and corresponding peak power effective for ablating the coating to form a plasma and shock wave therein. The plasma is confined adjacent the target to plastically deform the target by the shock wave to develop residual compressive stress therein. The pulse has a duration less than ten nanoseconds and a corresponding peak power for increasing coupling efficiency between the pulse and plasma.

DETAILED DESCRIPTION OF THE INVENTION

Figure 1:
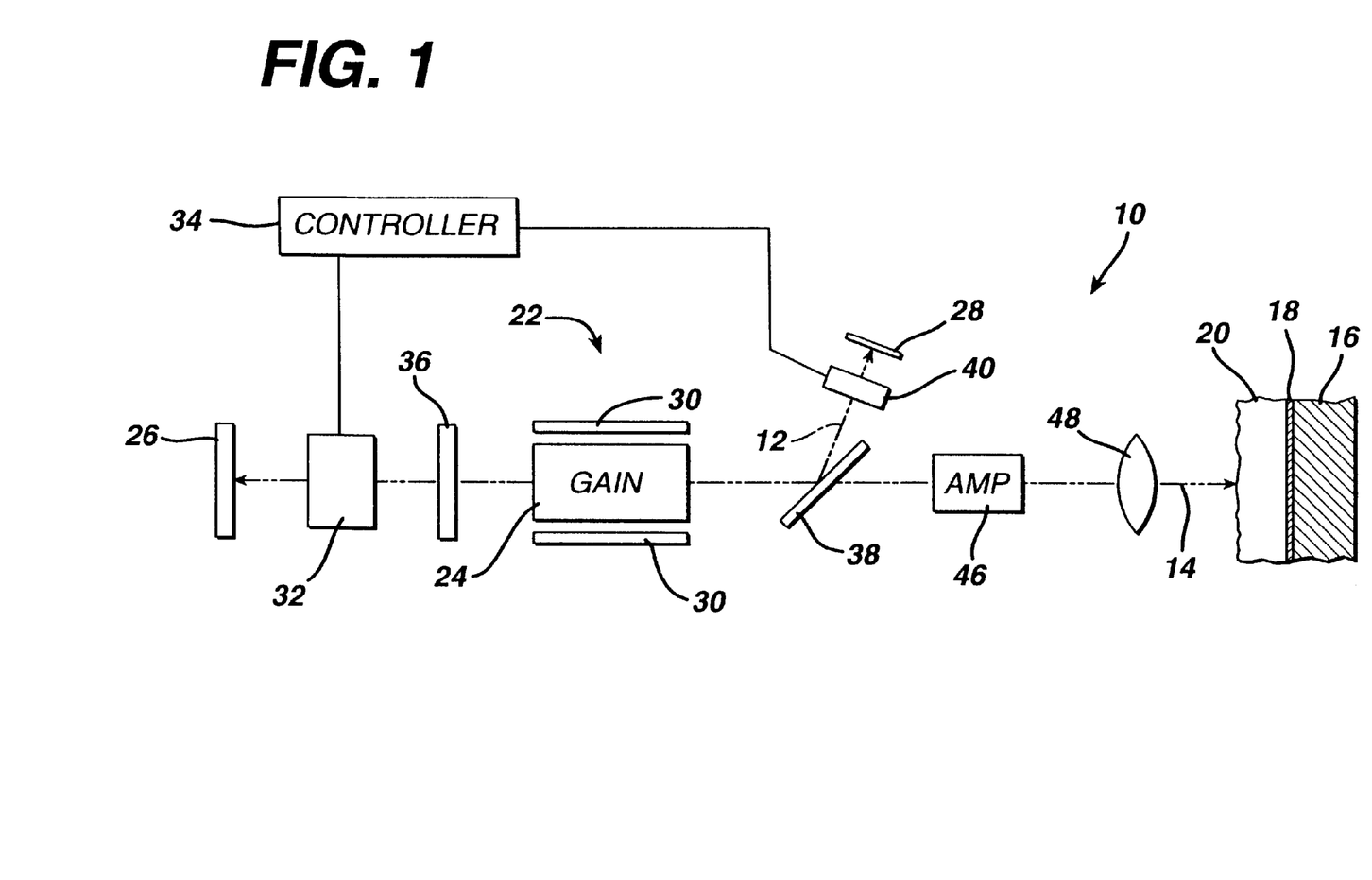
FIG. 1 is a schematic representation of a laser system effective for emitting short duration laser pulses for laser shock peening a target in accordance with an exemplary embodiment of the present invention.

Illustrated schematically in FIG. 1 is a laser shock peening apparatus or system 10 in accordance with an exemplary embodiment of the present invention. Apparatus 10 is effective for generating a circulating laser beam 12 that is dumped to produce a laser beam pulse 14, which pulse 14 is directed at a metallic workpiece or target 16 for developing residual compressive stress at and below the surface thereof.

Target 16 may take any suitable form and may include a conventional ablative coating 18 in the form of black paint for example. A thin film of water or other transparent and elastic medium 20 is suitably provided over the coating for confining the exploding plasma resulting from impingement of the laser beam pulse 14 against coating 18.

Accordingly, a pressure pulse develops against the surface of target 16 causing the propagation of shock or stress waves into the target material that plastically deform the regions at and near the surface to retain a residual compressive stress thereat. A series or train of laser pulses 14 is suitably scanned across the surface of target 16 for obtaining substantially uniform laser shock peening thereof.

Apparatus 10 is an assembly of optical components including means for generating circulating laser beam 12 in a cooperating oscillator or resonator 22 having a lasing or gain medium 24. Means for dumping the laser beam from oscillator 22 produce laser beam pulse 14.

In order to obtain laser pulses 14 with suitable energy and temporal shape, oscillator 22 is preferably a Q-switched, cavity-dumped oscillator and may take various conventional configurations. For example, oscillator 22 typically includes first and second end mirrors 26, 28 having 100% reflectivity for circulating laser beam 12 therebetween as it is formed. End mirrors 26, 28 are optically aligned on opposite sides of gain medium 24 that cooperates with conventional flash lamps 30 for optically pumping gain medium 24 to develop laser beam 12 as laser beam 12 circulates between end mirrors 26, 28. Gain medium 24 and flash lamps 30 define a laser head that may take any conventional form, with suitable cooling thereof.

In order to generate laser beam 12 from oscillator 22 upon achieving a suitable energy level, means in the form of a first Pockels cell 32 are disposed in optical alignment with medium 24 and end mirrors 26, 28. Pockels cell 32 is controlled by a driver forming part of an electrical controller 34 for effecting switching thereof to generate a circulating laser pulse 12 and periodically emit laser beam pulses 14 in a train. Pockels cell 32 preferably cooperates with a quarter-wave plate 36 and a polarizer 38 optically aligned between end mirrors 26, 28 in any suitable manner, such as on opposite sides of gain medium 24.

The components of oscillator 22 are conventional in configuration and function. Pockels cell 32 is operable in a regeneration mode for circulating nascent laser beam 12 in oscillator 22 as energy is pumped therein from flash lamps 30. In the regeneration mode, polarizer 38 acts as a mirror to reflect laser beam 12 obliquely to second end mirror 28, and in this way, laser beam 12 circulates back and forth between end mirrors 26, 28 as energy builds in gain medium 24.

Pockels cell 32 is also operable in a dumping mode for dumping laser beam 12 at or through polarizer 38 when sufficient energy is reached in oscillator 22 for laser pulse 14 being emitted therefrom.

Pockels cell driver 34 operates by providing a bias voltage across Pockels cell 32 for selectively controlling the wave retardation thereof. After medium 24 is initially pumped, driver 34 provides a bias voltage on Pockels cell 32 in the regeneration or high-Q mode to effect a suitable wave retardation so that the developing beam oscillates off polarizer 38 and between end mirrors 26, 28 for increasing energy in beam 12 by regeneration. When the oscillator beam reaches peak power, driver 34 suitably reduces the bias on Pocket cell 32 to change the retardation for diverting beam 12 through polarizer 38, bypassing second end mirror 28 for dumping laser beam pulse 14.

Oscillator 22, between end mirrors 26, 28, defines a cavity therebetween having an optical length that controls the round trip transit time of oscillating laser beam 12 that determines the pulse width or duration of laser beam 12. The rise time of the pulses produced by oscillator 22 is controlled by the switching time of Pockels cell 32. In a preferred embodiment, oscillator 22 is effective for generating a series of laser beam pulses 14 each having an inherently sharp leading edge and suitable duration for establishing a suitable amplitude and temporal shape in the pressure pulse developed at target 16 for improving the laser shock peening process.

In accordance with a preferred embodiment of the present invention, the basic cavity dumping technique is modified to a self-injected regenerative amplifier scheme by introducing a second Pockels cell 40 optically aligned between polarizer 38 and second mirror 28, for example. Second Pockels cell 40 has a corresponding driver and is operatively joined to controller 34 for being synchronized with operation of first Pockels cell 32. The so configured oscillator 22 defines an intracavity injected, Q-switch, cavity dumping oscillator 22 that is effective for emitting laser pulses 14 with short pulse duration.

A typical cavity dumping resonator configured for laser shock peening produces laser pulses of about 10–20 nanosecond (ns) duration with a short rise time leading edge. Cavity-dumping oscillators produce pulses with a duration essentially equal to the cavity round trip time between end mirrors 26, 28. As indicated above, significant control parameters in laser shock peening include fluence, and intensity or irradiance, which is obtained by dividing that parameter by the pulse duration. Laser shock peening requires a minimum fluence and energy per laser pulse for ablating the target coating and creating a pressure impulse sufficient to plastically deform the target. This typically requires a high energy laser system with substantially large laser parameters of about 50 Joules per pulse, 200 Joules per square centimeter corresponding with a quarter square centimeter pulse area, and pulse duration greater than about 10 ns and typically about 20 ns. With a 20 ns pulse duration, a peak intensity or power of about 2.5 Gigawatts (GW) is effected.

In accordance with the present invention, development experience has shown that energy and fluence requirements for laser-induced phenomena such as material removal using lasers decrease as the applied peak intensity increases, and that laser-plasma energy coupling is also sensitive to the applied laser peak intensity. The dependence of the fluence and energy threshold for laser-material interactions results from the existence of nonlinear optical laser-material interactions.

Optical absorption is described by the absorption law that relates the change of the intensity or irradiance of a laser or other optical source as proportional to a series of material dependent absorption coefficients which multiply the terms of a polynomial in the applied laser intensity:

$$dI/dz - (aI + bI^2 + cI^3 +$$ (1)

In equation (1), $dI/dz$ is energy absorbed by interaction with a material at position z. The coefficient "a" describes linear absorption of radiation; "b" describes absorption proportional to the square of the applied intensity, and so on. Typically, $a >> b >> c$ and linear effects are the strongest at low intensity.

However, as the intensity I increases, $I^2$ and $I^3$ increase faster than I and the nonlinear contributions to the absorption law can become dominant. In this way, optical absorption by the ablative coating material or the plasma formed by optical absorption of the nascent vaporized material, and the events thereby initiated can be effected more efficiently at lower pulse energy and fluence by reduction of the laser pulse duration since I is defined as energy per unit area per unit time.

Similarly, the time ordering of the ablation, plasma-pressure impulse formation, confinement layer breakdown, and energy dissipation events that define the generation of the shock impulse allow for the possibility of unique regimes of peak power (the rate at which optical energy is delivered to the workpiece within the laser pulse) and pulse repetition rate to optimize the amplitude and duration of the plasma-pressure impulse in laser shock peening.

The compromise trade-offs to be made regarding optimal laser parameters arise from the same considerations applied to minimizing competitive energy dissipation processes as are applied to optimizing the plasma-shock impulse generation. Examples of competitive processes include nonlinear optical breakdown of the confinement layer, reflection of laser energy by the plasma, generation of non-optimal plasma-shock amplitude, etc.

This discovery forms the basis of the present invention in that instead of using laser pulses with high energy, high fluence, and long, i.e., greater than ten nanoseconds, duration for effecting laser shock peening, such peening may be effected with shorter and less energetic laser pulses having significant advantages in reducing size and complexity, and reducing susceptibility to optical damage of the laser system. By defining a laser system producing lower energy in the final amplification stage, the size of the main amplifier or resonator may be substantially reduced, and correspondingly the pulse repetition rate may be substantially increased providing significant advantages for a commercially viable laser shock peening system requiring a relatively high throughput performance for peening large areas.

Figure 2:
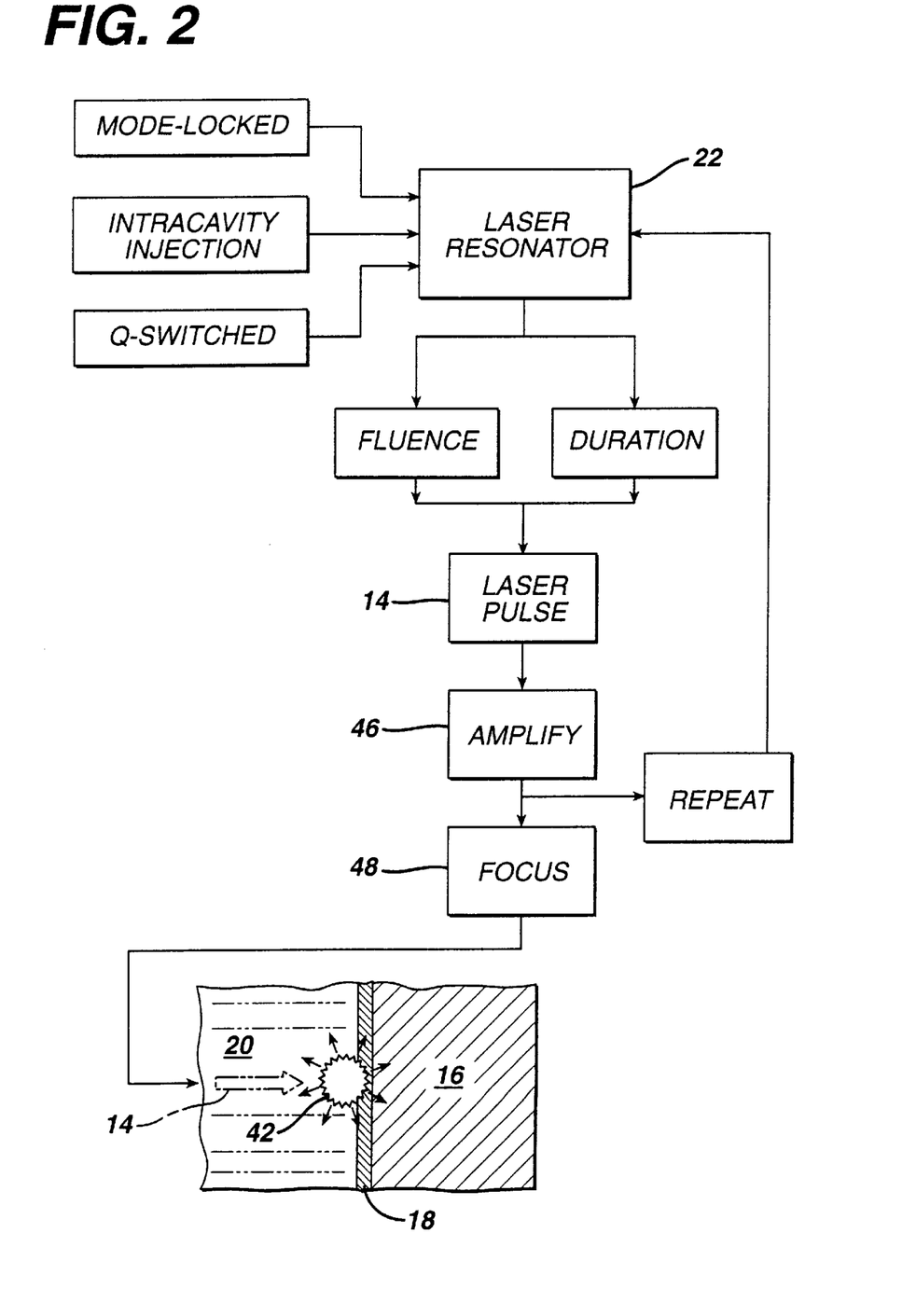
FIG. 2 is a flowchart representation of a method for laser shock peening a target in accordance with an exemplary embodiment of the present invention.

The intracavity injected laser oscillator 22 illustrated in FIG. 1 may be configured and operated in accordance with the present invention for directing against ablative coating 18 atop target 16 a laser beam pulse 14 having a fluence, duration, and corresponding peak power or intensity effective for ablating the coating to form a high temperature plasma 42 as illustrated schematically in the flowchart of FIG. 2. The explosive release of energy in the ablative coating generates plasma 42 and a corresponding pressure shock wave therein which are confined adjacent target 16 by overlying water 20. The pressure pulse developed in the plasma impinges target 16 to plastically deform its surface to develop residual compressive stress therein.

The minimum threshold fluence for laser shock peening can be reduced by increasing the laser intensity or irradiance at target 16 workpiece by decreasing the laser pulse duration at pulse energy lower than 50 Joules due to the complex dependence of the plasma pressure impulse on the instantaneous power of the laser pulse and the nonlinear optical coupling of the laser to the workpiece and nascent plasma. The pulse has a duration less than about 10 ns and a corresponding peak power preferably greater than one gigawatt for increasing the coupling efficiency between the laser pulse energy and the plasma pressure impulse.

A significant problem of conventional laser shock peening laser systems is that laser pulses having long durations greater than about 10 nanoseconds are less efficient than shorter pulses at ablating the coating to initiate a plasma and the subsequent pumping of the nascent plasma to raise the temperature to the magnitude required to generate an adequate pressure impulse. The sub-optimal efficiency is a consequence of the low peak power and the long pulse duration having a lower coupling efficiency with the ablative layer and plasma, and higher energy losses due to energy transport out of the laser material interaction volume.

A shorter pulse duration and corresponding higher peak power or intensity requires fewer photons to start the plasma and heat it to the critical temperature required for peening due to higher absorption efficiency and lower losses. The lower energy budget for the formation of pressure impulse allows the laser design to accommodate a higher repetition rate operating mode that can support higher process throughput. Another significant benefit is that less material from the ablative coating may be required to achieve the critical pressure impulse, and accordingly the coating may be able to sustain multiple laser hits before needing to be replenished or replaced.

Peening is controlled by the magnitude of the pressure pulse at the target which effects plastic deformation. The shock induced pressure is a nonlinear function of power density or flux expressed in watts per square centimeter. The pressure typically increases with increasing laser intensity at the target, with actual scaling law similar to that on the right hand side of equation (1). Coupling efficiency may therefore be substantially increased with higher power densities effected by correspondingly reducing the pulse duration. The shorter laser pulses are used to increase peak power and correspondingly increase laser-plasma coupling efficiency and the corresponding pressure pulse with suitable levels of fluence.

There are several known techniques for generating short optical pulses from a laser including Q-switching, cavity dumping, mode locking, and intracavity injection, and combinations thereof. In Q-switching, pulse duration is greater than the round trip transit time in the cavity. In cavity dumping, the pulse duration is generally equal to the round trip transit time and is limited by the practical reduction in oscillator length to about 5 ns. In mode locking, significantly shorter pulses may be obtained down to about a few picoseconds. And in intracavity injection, sub-nanosecond to a few nanosecond pulses may be obtained.

However, the efficiency of these different techniques varies, and their usefulness and complexity for high power applications such as laser shock peening also varies.

In a preferred embodiment as illustrated in FIG. 1, the introduction of the Pockels cell 40 modifies the cavity dumping oscillator 22 into an intracavity injected, Q-switched, cavity dumping oscillator useful for laser shock peening. Oscillator 22 is operated in accordance with the present invention with a pulse duration less than 10 ns and a corresponding peak power for increasing coupling efficiency between pulse 14 and plasma for providing substantial improvement over longer pulse shock peening methods.

Laser system 10 is preferably operated for repetitively directing a train or series of short duration laser beam pulses 14 against an area of the target coating 18 at a repetition rate greater than about one pulse per second which is substantially greater than the repetition rate of known high power laser systems. In this way, a significant throughput may be effected for peening large areas of a target 16 in a commercially viable system.

In a preferred embodiment of the invention, the repetition rate may be up to about 100 cycles per second, which rate may be achieved by correspondingly reducing the pulse duration. Since a given laser system has an average power capability that is limited, that power may be used more efficiently in shorter duration pulses with correspondingly higher peak power, and with a correspondingly high repetition rate that effects peening at greater efficiency and throughput.

Since the peak power or intensity is the fluence divided by the pulse duration, shorter pulse durations achieve a correspondingly greater peak power, which in turn has increased coupling efficiency with the plasma and more effectively laser shock peens the target. Accordingly, the energy per pulse may be substantially reduced while still achieving suitable peak power using shorter duration pulses. And, the lower pulse energy reduces the average power requirements for the laser system including the oscillator. The lower power laser system enjoys associated benefits therewith including reduced size, complexity, and cost while providing further benefits in increased efficiency, stability, and performance.

In a preferred embodiment, the pulse duration is greater than about 0.01 ns and is preferably not larger than about 5 ns. Such short duration laser pulses with suitable power for effecting laser shock peening may be effected using exemplary laser system 10 illustrated in FIG. 1. This system is configured to produce pulses of continuously adjustable duration up to the cavity round trip time.

Figure 3:
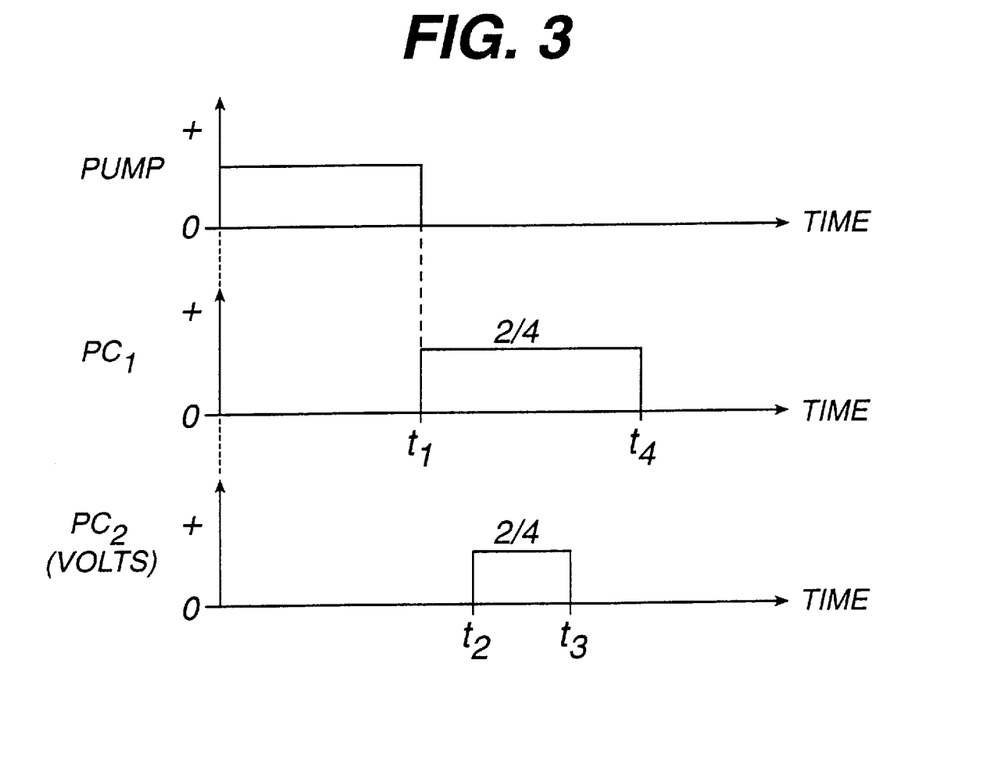
FIG. 3 is a timing diagram for the laser system illustrated in FIG. 1.

FIG. 3 is an exemplary timing diagram for the operation of the FIG. 1 laser system 10. Oscillator 22 is initially operated in a pumping cycle that ends at the first time $t_1$ at which first Pockels cell 32 is switched to quarter wave voltage and acts as a Q-switch. After a suitable delay, when some circulating power in oscillator 22 has been established, but before oscillator 22 starts to deplete the gain in gain medium 24, oscillator 22 is bled between the second time $t_2$ and the third time $t_3$ by switching second Pockels cell 40 to quarter wave voltage and back to zero voltage.

During the time interval between the second and third times, which is shorter than the round trip time, a complete section of the circulating train of photons is removed through polarizer 38 and discarded. The remaining fraction of the circulating train of photons stays in oscillator 22, grows, and eventually extracts the energy stored in gain medium.

At such fourth time $t_4$, the cavity is dumped by switching first Pockels cell 32 back to zero voltage as is done in a conventional cavity dumping technique. The only difference with respect to the conventional cavity dumping technique is that at the time the cavity is dumped the cavity is not filled with a continuous train of photons, but rather a short circulating pulse that is released at the dumping time. The resulting pulse duration is continuously adjustable by the difference between the round trip time and the selected interval between the second and third times.

If the switching time $t_4$ is chosen such that the circulating pulse is not near the first Pockels cell 32 at that time, the temporal shape of the output pulse is completely determined by the switching of second Pockels cell 40. Accordingly, second Pockels cell 40 is switched at a suitably fast speed, whereas first Pockels cell 32 need only be faster than the cavity round trip time.

There are many variations of this type of oscillator 22. For example, second Pockels cell 40 may be positioned anywhere in oscillator 22. The cavity dumping may be accomplished by either of the two Pockels cells. Second Pockels cell 40 may even be eliminated and its role taken over by first Pockels cell 32 if the voltage of first Pockels cell 32 is either reduced to zero or increased to the half wave value between the second and third times, and restored to the quarter wave value at the third time.

Figure 4:
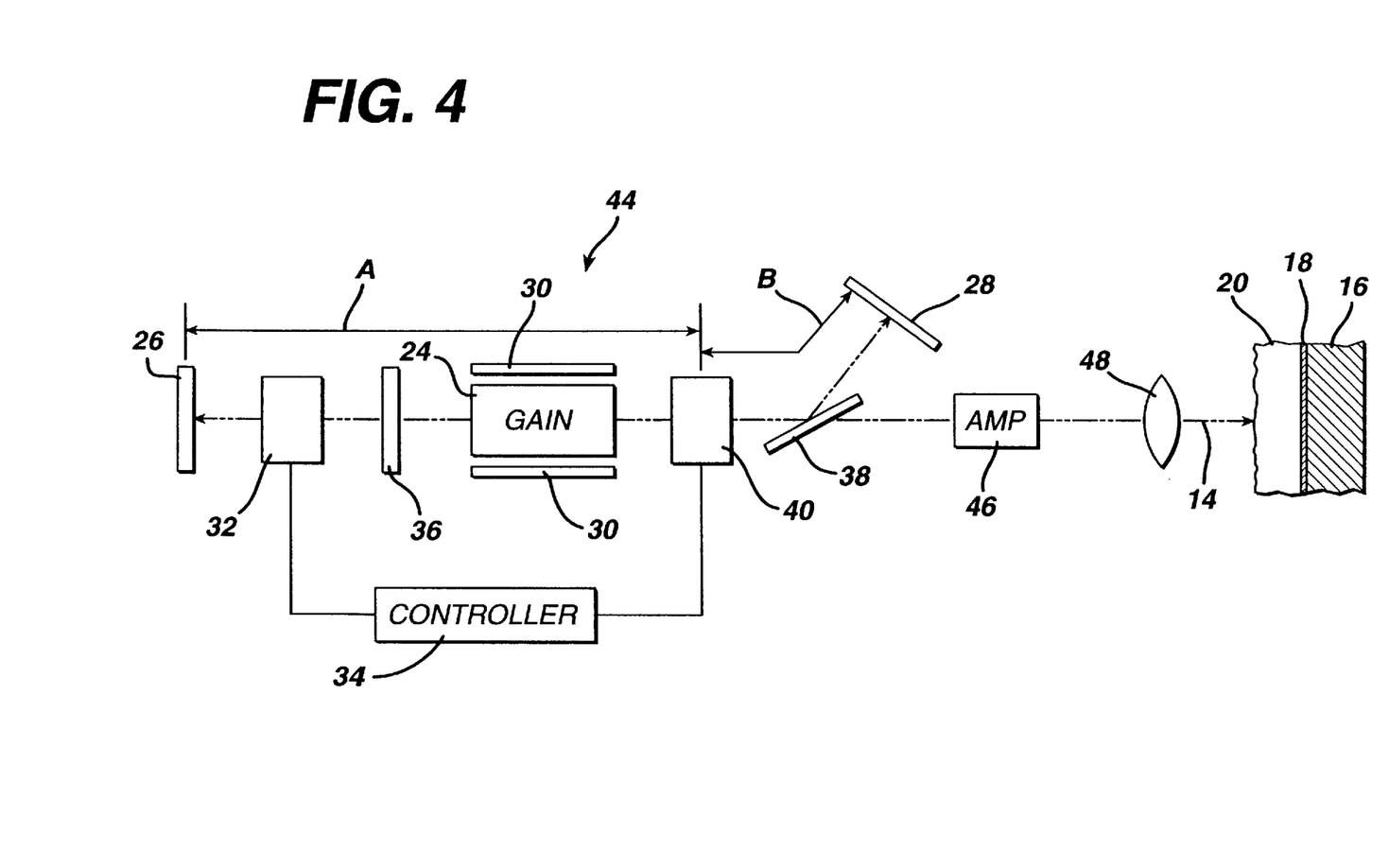
FIG. 4 is schematic representation of a laser system for shock peening a target in accordance with another embodiment of the present invention.
Figure 5:
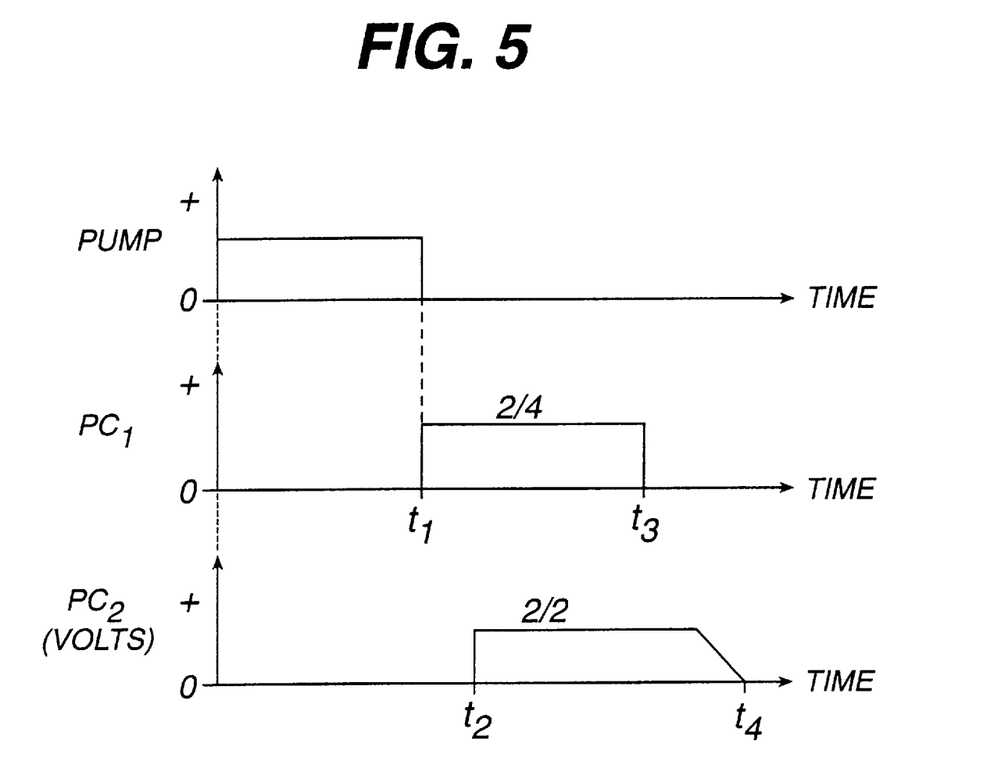
FIG. 5 is a timing diagram for the laser system illustrated in FIG. 4.

FIG. 4 illustrates another embodiment of the intracavity injection, Q-switched, cavity dumping resonator, designated 44, for producing short laser beam pulses of fixed duration. FIG. 5 is the corresponding timing diagram therefor.

In this embodiment, gain medium 24 is located in first leg A between first mirror 26 and second Pockels cell 40, with a second leg B being defined between Pockels cell 40 and second mirror 28, with polarizer 38 being disposed therebetween. In this configuration, second leg B may be made relatively short in length for effecting a correspondingly short duration output pulse having a magnitude being twice that length divided by the speed of light. This embodiment is possible because gain medium 24 performs equally well with horizontal or vertical linear polarization.

As in the first embodiment illustrated in FIG. 1, suitable timing of the cavity dumping is effected so that the rise and fall times of the output laser pulse are completely determined by the switching speed of second Pockels cell 40. The cavity may be dumped by either Pockels cell 32,40.

Oscillator 44 illustrated in FIG. 4, the dumping is preferably effected by first Pockels cell 32 at the third time $t_3$. In that case, the return to zero voltage of the second Pockels cell 40 at the fourth time $t_4$ is not critical.

If the dumping is accomplished with the second Pockels cell 40, the roles of the third and fourth times $t_3$ and $t_4$ are exchanged.

Oscillator 44 may be operated with a single Pockels cell, in which case first Pockels cell 32 would be eliminated, quarter wave plate 36 would be moved to the opposite side of gain medium 24 adjacent second Pockels cell 40, and the voltage across second Pockels 40 cell would be zero before the first time $t_1$, quarter wave voltage between the first and second times $t_1$ and $t_2$, three quarter wave voltage between the second and third times $t_2$ and $t_3$, and back to quarter wave voltage at the third time $t_3$ to dump the cavity. The transition for dumping should occur when the circulating pulse is in the first leg A of the resonator. After the pulse is dumped, the voltage across Pockels cell 40 can return to zero with uncritical timing.

Whereas a conventional laser system for shock peening based on cavity dumping effects a pulse energy of about 50 Joules per pulse, the systems disclosed in FIGS. 1 and 4 may be configured for generating a pulse 14 having a substantially lower energy within a range of about 0.01 Joule to about 10 Joules. This may be effected by using a slab gain medium 24 as opposed to a rod gain medium.

Corresponding with this lower pulse energy requirement, a suitable fluence may be within the exemplary range of about 0.05 Joules per square centimeter to about 40 Joules per square centimeter for a laser pulse having a quarter centimeter effective area.

Additional efficiencies and reduced cost may be obtained by using a slab gain medium 24 in the conventional form of Nd:YAG. Since this type of laser gain medium has limited energy storage potential, additional amplification is preferably used therewith.

For example, FIG. 1 illustrates an additional amplifier 46 optically aligned between polarizer 38 and target 16 for amplifying laser pulse 14 from oscillator 22 for increasing its energy. Amplifier 46 may take any conventional configuration, including one or more amplifiers in turn.

The amplified laser pulse is preferably directed through suitable optics 48 disposed in optical alignment between amplifier 46 and target 16 for focusing the amplified pulse against target coating 18. Optics 48 may take any conventional form including focusing lenses and folding mirrors as desired for directing laser pulse 14 in a suitably small spot area atop the ablative coating 18 for the laser shock peening process.

In this way, basic oscillator 22 may be sized and configured to emit laser pulse 14 initially with an energy up to about one Joule, and amplifier 46 is sized and configured to amplify the emitted pulse to an energy substantially greater than 0.01 Joule and up to about 10 Joules for example. This combination uses a relatively simple and inexpensive intracavity dumping oscillator 22 with a Nd:YAG slab gain medium 24 to initially produce the short duration laser pulses to the limit of its energy capability. The correspondingly short laser pulses effect a relatively large peak power per pulse and is suitably amplified in the second stage amplifier 46 prior to impinging ablative coating 18.

Ablative coating 18 therefore experiences a laser pulse with a high peak energy and power and a relatively low pulse duration which more efficiently couples the energy of the pulse to the ablative coating and resulting plasma for effectively peening target 16. In this way, a laser system having relatively lower average power may be used instead of a laser system having high average power for effecting laser shock peening with enhanced efficiency. The lower power of the oscillator 22 and the short pulse durations have a synergistic effect in permitting a relatively high repetition rate which is not otherwise available in high power pulse lasers. The throughput capability of the laser system is therefore correspondingly greater than that attainable from a large power laser-based peening system.

In view of the exemplary range of pulse durations usable for laser shock peening, the type of laser oscillator will be chosen to maximize system performance. For the shortest duration pulses, a mode-locked oscillator with cavity-dumped or Q-switched pulse extraction is preferred. For an intermediate pulse duration, an intracavity injected, Q-switched, cavity dumped oscillator is preferred. And, for longer pulse durations, a Q-switched oscillator is preferred. These options are shown schematically in FIG. 2.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A method for laser shock peening a target for developing residual compressive stress at a surface thereof, comprising:
   directing against an ablative coating atop said target a laser beam pulse having a fluence, duration, and corresponding peak power effective for ablating said coating to form a plasma and shock wave therein;
   confining said plasma adjacent said target to plastically deform said target by said shock wave to develop said residual compressive stress therein; and
   said pulse having a duration not longer than about five nanoseconds and a corresponding peak power for increasing coupling efficiency between said pulse and said plasma.

2. A method according to claim 1 further comprising repetitively directing a train of said pulses against an area of said target coating at a repetition rate greater than one pulse per second.

3. A method according to claim 2 wherein said repetition rate is up to about one hundred pulses per second.

4. A method according to claim 2 wherein said pulse duration is greater than about 0.01 nanoseconds.

5. A method according to claim 2 wherein said pulse has an energy within a range of about 0.01 Joule to about ten Joules.

6. A method according to claim 5 wherein said fluence is within a range of about 0.05 Joules per square centimeter and about forty Joules per square centimeter.

7. A method according to claim 2 wherein an oscillator 22, 33 includes a slab gain medium 24.

8. A method according to claim 7 wherein said slab comprises Nd:YAG.

9. A method according to claim 8 further comprising:
   amplifying said pulse 14 from a resonator 22; and
   focusing said amplified pulse against said target coating 18.

10. A method according to claim 8 wherein a resonator 22 is sized to emit said pulse 14 with an energy up to about one Joule, and said amplifier is sized to amplify said emitted pulse.

11. A method according to claim 2 wherein said pulse train originates in an intracavity injected, Q-switched, cavity dumping oscillator.

12. A method for laser shock peening a target for developing residual compressive stress at a surface thereof, comprising:
   directing against an ablative coating atop said target a laser beam pulse having a fluence, duration, and corresponding peak power effective for ablating said coating to form a plasma and shock wave therein;
   confining said plasma adjacent said target to plastically deform said target by said shock wave to develop said residual compressive stress therein; and
   said pulse having a duration less than ten nanoseconds and a corresponding peak power for increasing coupling efficiency between said pulse and said plasma wherein said pulse train originates in a mode-locked and cavity dumped oscillator.

13. A method for laser shock peening a target for developing residual compressive stress at a surface thereof, comprising:
   directing against an ablative coating atop said target a laser beam pulse having a fluence, duration, and corresponding peak power effective for ablating said coating to form a plasma and shock wave therein;
   confining said plasma adjacent said target to plastically deform said target by said shock wave to develop said residual compressive stress therein; and
   said pulse having a duration less than ten nanoseconds and a corresponding peak power for increasing coupling efficiency between said pulse and said plasma wherein said pulse train originates in a mode-locked and Q-switched oscillator.

* * * * *